(12) United States Patent
Liang et al.

(10) Patent No.: US 11,216,615 B2
(45) Date of Patent: Jan. 4, 2022

(54) METHOD, DEVICE AND STORAGE MEDIUM FOR PREDICTING PUNCTUATION IN TEXT

(71) Applicant: BAIDU ONLINE NETWORK TECHNOLOGY (BEIJING) CO., LTD., Beijing (CN)

(72) Inventors: Mingxin Liang, Beijing (CN); Xiaoyin Fu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/036,561

(22) Filed: Sep. 29, 2020

(65) Prior Publication Data

US 2021/0224480 A1 Jul. 22, 2021

(30) Foreign Application Priority Data

Jan. 16, 2020 (CN) .......................... 202010046714.1

(51) Int. Cl.
*G06F 40/279* (2020.01)
(52) U.S. Cl.
CPC .................................. *G06F 40/279* (2020.01)
(58) Field of Classification Search
CPC ....... G06F 40/279; G06F 40/103; G06N 3/08; G06N 3/0445; G06N 3/0472
USPC ........................................................... 704/9
See application file for complete search history.

(56) References Cited

U.S. PATENT DOCUMENTS

2015/0095025 A1 4/2015 Fritsch et al.
2019/0103091 A1 4/2019 Chen

FOREIGN PATENT DOCUMENTS

CN 108845682 A 11/2018

OTHER PUBLICATIONS

European Patent Application No. 20215758.2 extended Search and Opinion dated May 20, 2021, 8 pages.
Gale, W. et al. "Experiments in Character-Level Neural Network Models for Punctuation" Interspeech 2017, Jan. 1, 2017, pp. 2794-2798.

*Primary Examiner* — Thierry L Pham
(74) *Attorney, Agent, or Firm* — Lathrop GPM LLP (57) ABSTRACT

The disclosure provides a method, a device and a storage medium for predicting a punctuation in a text. The method includes: inputting a text to be predicted into a sequence tagging model to obtain at least one prediction result and a corresponding first score of each character in the text to be predicted; generating a text to be inputted corresponding to each of the at least one prediction result; obtaining a second score corresponding to each of the at least one prediction result; determining a punctuation existence situation of the corresponding character based on the first score and the second score corresponding to each of the at least one prediction result; and performing punctuation processing on the text to be predicted based on the punctuation existence situation of each character in the text to be predicted to obtain a punctuated text corresponding to the text to be predicted.

20 Claims, 4 Drawing Sheets

METHOD, DEVICE AND STORAGE MEDIUM FOR PREDICTING PUNCTUATION IN TEXT

CROSS-REFERENCE TO RELATED APPLICATION

This application claims priority to Chinese Patent Application No. 202010046714.1, filed on Jan. 16, 2020, the entire contents of which are incorporated herein by reference for all purpose.

FIELD

The present disclosure relates to a field of data processing technologies, specifically, to a field of text tagging technologies, and more particularly, to a method, a device and a storage medium for predicting a punctuation in a text.

BACKGROUND

The current method for predicting a punctuation of a text uses a sequence tagging model or a language model to determine whether the punctuation follows each character in the text and a type of the punctuation. However, the sequence tagging model has poor adaptability to new words and hot words; and the language model has poor generalization ability, such that a slight difference in the text may result in a different result. Consequently, the efficiency of predicting the punctuation is low.

SUMMARY

The present disclosure provide a method for predicting a punctuation in a text, including: inputting a text to be predicted into a preset sequence tagging model to obtain at least one prediction result and a first score corresponding to each of the at least one prediction result of each character in the text to be predicted, in which each of the at least one prediction result represents whether a punctuation follows the corresponding character and a type of the punctuation; generating a text to be inputted corresponding to each of the at least one prediction result based on the text to be predicted and the corresponding prediction result; inputting the text to be inputted into a preset language model to obtain a second score corresponding to each of the at least one prediction result; determining a punctuation existence situation of the corresponding character based on the first score and the second score corresponding to each of the at least one prediction result; and performing punctuation processing on the text to be predicted based on the punctuation existence situation of each character in the text to be predicted to obtain a punctuated text corresponding to the text to be predicted.

The present disclosure provides an electronic device. The electronic device includes at least one processor and a storage device coupled to the at least one processor. The storage device stores an instruction executable by the at least one processor. When the instruction is executed by the at least one processor, the at least one processor may implement the above method.

The present disclosure provides a non-transitory computer-readable storage medium having a computer instruction stored thereon. The computer instruction is configured to make a computer implement the above method.

Other effects of the above-mentioned implementations will be described below in combination with specific embodiments.

BRIEF DESCRIPTION OF THE DRAWINGS

The accompanying drawings are used for a better understanding of the solution, and do not constitute a limitation to the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, those skilled in the art should recognize that various changes and modifications may be made to the embodiments described herein without departing from the scope and spirit of the present disclosure. Also, for clarity and conciseness, descriptions of well-known functions and structures are omitted in the following description.

A method and apparatus for predicting a punctuation according to embodiments of the present disclosure will be described below in combination with the drawings.

Figure 1:
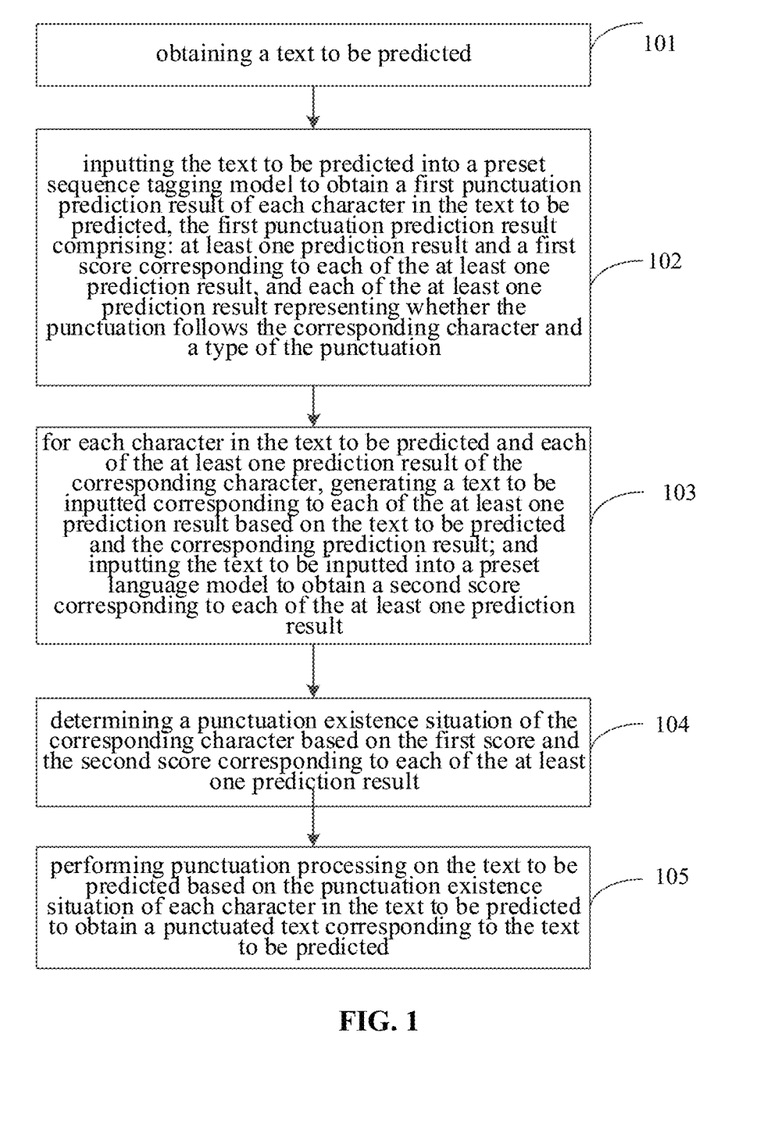
FIG. 1 is a schematic diagram according to Embodiment 1 of the present disclosure.

FIG. 1 is a schematic diagram according to Embodiment 1 of the present disclosure. It should be noted that an executive subject of the method for predicting the punctuation according to embodiments of the present disclosure is the apparatus for predicting the punctuation. The apparatus may be implemented by software and/or hardware, and configured in a terminal device or a server, which is not limited in embodiments of the present disclosure.

As illustrated in FIG. 1, the method for predicting the punctuation may include the following.

At block 101, a text to be predicted is obtained.

In the present disclosure, the text to be predicted may be an unpunctuated text. The unpunctuated text, for example, may be a text obtained after a speech recognition system recognizes speech, or an unpunctuated text obtained in the process of speech transcription.

At block 102, the text to be predicted is inputted into a preset sequence tagging model to obtain a first punctuation prediction result of each character in the text to be predicted. The first punctuation prediction result includes at least one prediction result and a first score corresponding to each of the at least one prediction result. Each of the at least one prediction result represents whether the punctuation follows the corresponding character and a type of the punctuation.

In the present disclosure, the process of performing step 102 by the apparatus for predicting the punctuation may include inputting the text to be predicted into the preset sequence tagging model to obtain the at least one prediction result corresponding to each character in the text to be predicted and a prediction probability of each of the at least one prediction result; and for each of the at least one prediction result of each character, performing reciprocal operation and logarithmic operation on the prediction probability of the corresponding prediction result to obtain the first score corresponding to the corresponding prediction result.

In the present disclosure, the sequence tagging model may be, for example, a recurrent neural network (RNN) model, a bidirectional-long short-term memory (Bi-LSTM) model, etc. Take the Bi-LSTM model as an example. The model includes four parts: an input window, a word vector, a BLSTM layer and a softmax inference layer. When an input is a text, an output of the softmax inference layer may be at least one prediction result corresponding to each character in the text and a prediction probability of each of the at least one prediction result. Take a character "good" in a text "I feel good today" as an example. There may be, for example, three prediction results corresponding to the character "good". One is that no punctuation follows the character "good", one is that a comma follows the character "good", and one is that a period follows the character "good".

In the present disclosure, for each of the at least one prediction result of each character, the reciprocal operation and the logarithmic operation are performed on the prediction probability of the corresponding prediction result to obtain the first score corresponding to the corresponding prediction result. The reciprocal operation and the logarithmic operation are performed on the prediction probability of the corresponding prediction result, such that the higher the prediction probability, the lower the score, that is, the lower the score, the higher the prediction probability.

In the present disclosure, the preset sequence tagging model is obtained after training an initial sequence tagging model using training data. The training data includes samples in an amount greater than a preset amount, and each sample includes an unpunctuated text and a corresponding sequence of punctuations. The preset amount may be, for example, 5 GB.

At block 103, for each character in the text to be predicted and each of the at least one prediction result of the corresponding character, a text to be inputted corresponding to each of the at least one prediction result is generated based on the text to be predicted and the corresponding prediction result. The text to be inputted is inputted into a preset language model to obtain a second score corresponding to each of the at least one prediction result.

In the present disclosure, an input of the language model is a piece of text, and an output of the language model is a perplexity of the piece of text. The lower the perplexity is, the higher the probability that the piece of text may appear. Therefore, a lower perplexity is better. In the present disclosure, the perplexity is determined as the score.

In the present disclosure, since the input of the language model is a piece of text, for each of the at least one prediction result of the corresponding character, the text to be inputted corresponding to each of the at least one prediction result is generated based on the text to be predicted and the corresponding prediction result. For example, the text to be inputted is "I feel good today", and the corresponding character is "good". If one prediction result is that no punctuation follows the character "good", the text to be inputted may be "I feel good"; if one prediction result is that a coma follows the character "good", the text to be inputted may be "I feel good,"; and if one prediction result is that a period follows the character "good", the text to be inputted may be "I feel good.".

In the present disclosure, the preset language model is obtained after training an initial language model using training data. The training data includes samples in an amount greater than a preset amount, and each sample includes an unpunctuated text and a corresponding punctuated text. The preset amount may be, for example, 1 TB.

At block 104, a punctuation existence situation of the corresponding character is determined based on the first score and the second score corresponding to each of the at least one prediction result.

In the present disclosure, the process of performing step 104 by the apparatus for predicting the punctuation may include, for each of the at least one prediction result of the character, obtaining the first score and the second score corresponding to the corresponding prediction result, performing a weighted sum calculation on the first score and the second score to obtain a total score corresponding to the corresponding prediction result, and determining the punctuation existence situation of the character based on a prediction result with a smallest total score.

In the present disclosure, the formula for calculating the total score may be, for example, denoted by:

$$\text{score} = \theta \times A + (1-\theta) \times B,$$

where score represents the total score, $\theta$ represents a weight of the second score, A represents the second score, and B represents the first score.

In the present disclosure, a merging algorithm for merging scores of the sequence tagging model and the language model may be the beam-search algorithm. The algorithm is able to merge a score of the sequence tagging model and a score of the language model for each of the at least one prediction result of each character in the text to be predicted, and to make a selection from the at least one prediction result, thereby reducing the amount of subsequent calculations.

At block 105, punctuation processing is performed on the text to be predicted based on the punctuation existence situation of each character in the text to be predicted to obtain a punctuated text corresponding to the text to be predicted.

In the present disclosure, the process of performing step 105 by the apparatus for predicting the punctuation may include, for each character in the text to be predicted, determining whether the punctuation follows the corresponding character based on the punctuation existence situation of the corresponding character; in response to that the punctuation follows the corresponding character, adding the punctuation to follow the character in the text to be predicted based on a type of the punctuation; and obtaining the punctuated text corresponding to the text to be predicted after all characters in the text to be predicted are processed.

Figure 2:
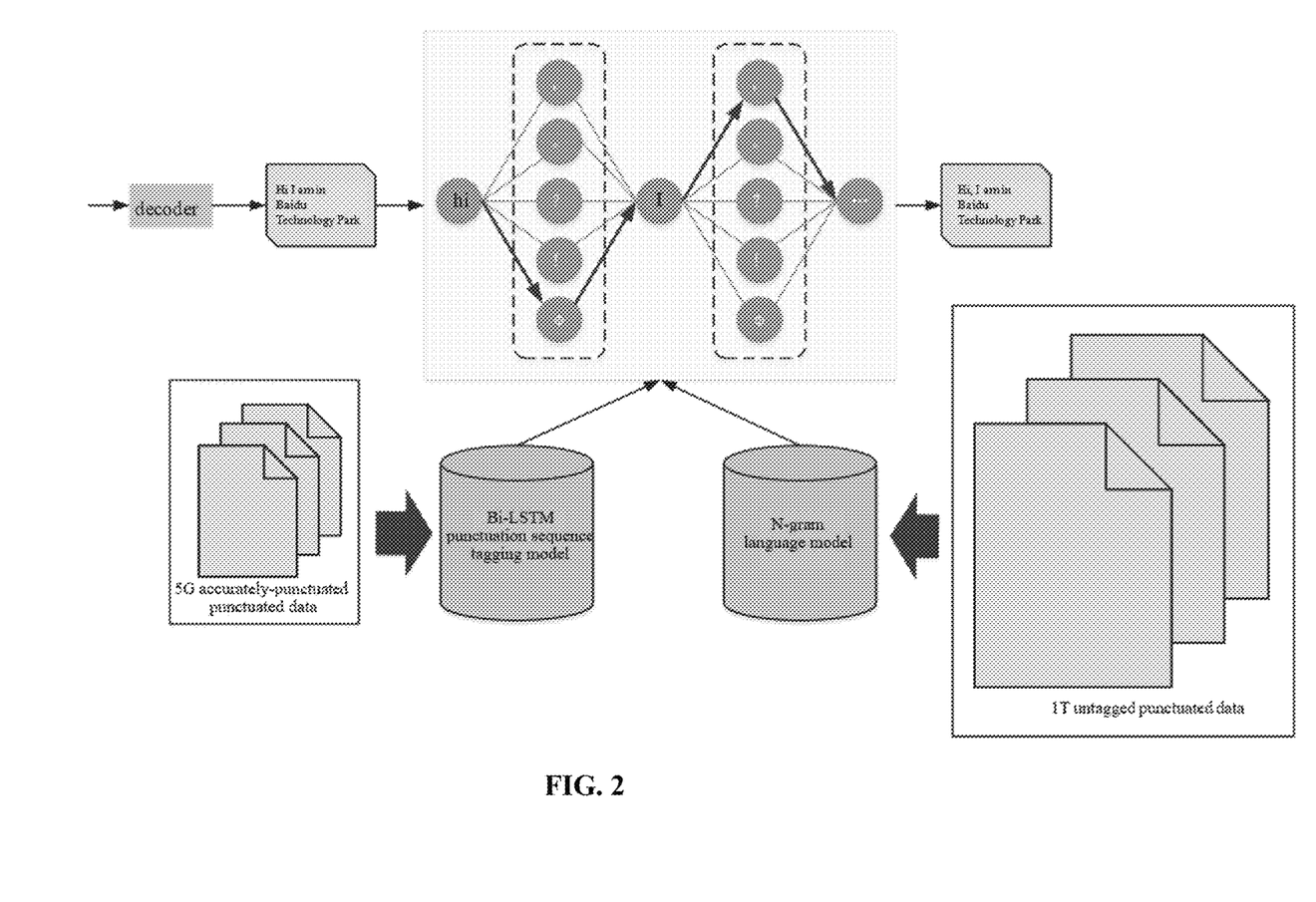
FIG. 2 is a schematic diagram of a method for predicting a punctuation.

In the present disclosure, the schematic diagram of the method for predicting the punctuation may be as illustrated in FIG. 2. In FIG. 2, the text to be predicted is "Hi I am in Baidu Technology Park", and the punctuated text corresponding to the text to be predicted is "Hi, I am in Baidu Technology Park.". In the process of predicting punctuations of the text to be predicted, both the sequence tagging model and the language model are adopted, so that advantages of the sequence tagging model and the language model may be combined, and the efficiency of predicting the punctuation may be improved.

With the method for predicting the punctuation, the text to be predicted is obtained. The text to be predicted is inputted into the preset sequence tagging model to obtain the first punctuation prediction result of each character in the text to be predicted. The first punctuation prediction result includes at least one prediction result and the first score corresponding to each of the at least one prediction result. Each of the at least one prediction result represents whether the punctuation follows the corresponding character and the type of the punctuation. For each character in the text to be predicted and each of the at least one prediction result of the corresponding character, the text to be inputted corresponding to each of the at least one prediction result is generated based on the text to be predicted and the corresponding prediction result. The text to be inputted is inputted into the preset language model to obtain the second score corresponding to each of the at least one prediction result. The punctuation existence situation of the corresponding character is determined based on the first score and the second score corresponding to each of the at least one prediction result. The punctuation processing is performed on the text to be predicted based on the punctuation existence situation of each character in the text to be predicted to obtain the punctuated text corresponding to the text to be predicted. Consequently, whether the punctuation follows each character in the text and the type of the punctuation are determined based on the sequence tagging model and the language model. In this manner, advantages of the sequence tagging model and the language model are combined, such that the efficiency of predicting the punctuation is improved.

Figure 3:
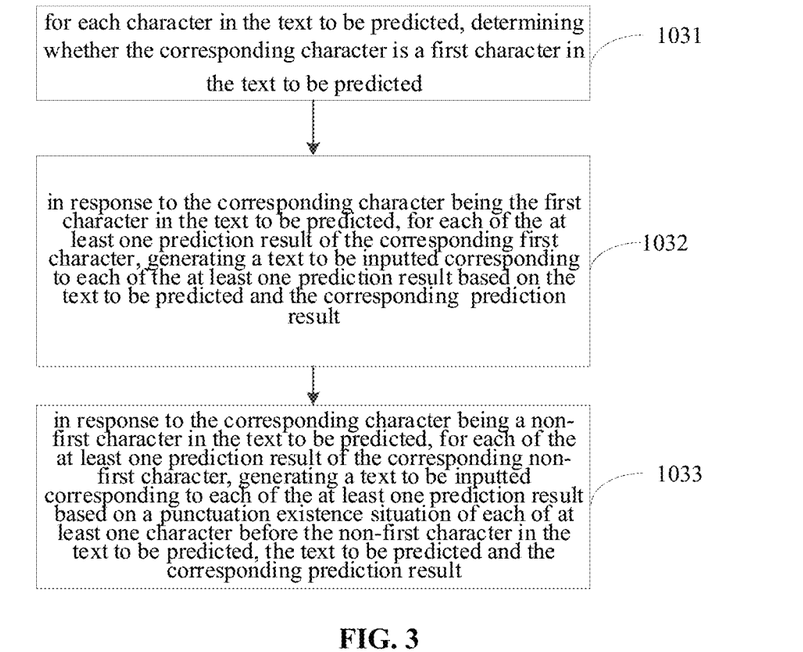
FIG. 3 is a schematic diagram according to Embodiment 2 of the present disclosure.

FIG. 3 is a schematic diagram according to Embodiment 2 of the present disclosure. As illustrated in FIG. 3, based on the embodiment illustrated in FIG. 1, step 103 may include the following steps.

At block 1031, for each character in the text to be predicted, it is determined whether the corresponding character is a first character in the text to be predicted.

In the present disclosure, the first character refers to a character that the text to be predicted starts with. In other words, the first character refers to the first one that appears in the beginning of the text to be predicted.

At block 1032, in response to the corresponding character being the first character in the text to be predicted, for each of the at least one prediction result of the corresponding first character, a text to be inputted corresponding to each of the at least one prediction result is generated based on the text to be predicted and the corresponding prediction result.

In the present disclosure, when the corresponding character is the first character in the text to be predicted, the text to be inputted corresponding to each of the at least one prediction result of the corresponding first character may include the first character and the content represented by the corresponding prediction result.

Furthermore, since one or more characters following the corresponding character have a relatively important influence on a score of each of the at least one prediction result of the corresponding character, the score of each of the at least one prediction result of the corresponding character may be determined based on the one or more characters following the corresponding character, and then, the text to be inputted corresponding to each of the at least one prediction result may be generated based on the one or more characters following the corresponding character. Therefore, in the present disclosure, when the corresponding character is the first character in the text to be predicted, the text to be inputted corresponding to each of the at least one prediction result of the corresponding first character may include the first character, the content represented by the corresponding prediction result, and one or more characters of a preset number following the corresponding first character in the text to be predicted.

At block 1033, in response to the corresponding character being a non-first character in the text to be predicted, for each of the at least one prediction result of the corresponding non-first character, a text to be inputted corresponding to each of the at least one prediction result is generated based on a punctuation existence situation of each of at least one character before the non-first character in the text to be predicted, the text to be predicted and the corresponding prediction result.

In the present disclosure, when the corresponding character is a non-first character in the text to be predicted, the text to be inputted corresponding to each of the at least one prediction result of the non-first character includes the at least one character before the non-first character in the text to be predicted, the non-first character, and the content represented by the corresponding prediction result.

Further, when the corresponding character is the non-first character in the text to be predicted, if the punctuation existence situation of some character before the non-first character is that a punctuation follows the some character, the text to be inputted is generated based on the punctuation existence situation of each character previous to the non-first character, such that the accuracy of the text to be inputted and the efficiency of predicting the punctuation are improved. Therefore, when the corresponding character is the non-first character in the text to be predicted, the text to be inputted corresponding to each of the at least one prediction result of the non-first character includes the at least one character before the non-first character, content represented by the punctuation existence situation of each of the at least one character before the non-first character, the non-first character, and content represented by the corresponding prediction result.

In response to that the corresponding prediction result represents that no punctuation follows the character, the content is empty; and in response to that the corresponding prediction result represents that a punctuation follows the character, the content is a type of the punctuation.

When a punctuation existence situation of a character before the non-first character represents that no punctuation follows the character before the non-first character, the content represented by the punctuation existence situation of the character before the non-first character is empty, and thus no punctuation is inserted after the character before the non-first character. When the punctuation existence situation of the character before the non-first character represents that a punctuation follows the character before the non-first character, the content represented by the punctuation existence situation of the character before the non-first character is a type of the punctuation, and then the punctuation is inserted after the character before the non-first character.

Furthermore, since one or more characters following the corresponding character have a relatively important influence on the score of each of the at least one prediction result of the corresponding character, the score of each of the at least one prediction result of the corresponding character may be determined based on the one or more characters following the corresponding character, and then, the text to be inputted corresponding to each of the at least one prediction result may be generated based on the one or more characters following the corresponding character. Therefore, in the present disclosure, when the corresponding character is the non-first character in the text to be predicted, the text to be inputted corresponding each of the at least one prediction result of the non-first character includes the at least one character before the non-first character, content represented by the punctuation existence situation of each of the at least one character before the non-first character, the non-first character, content represented by the corresponding prediction result, and a preset number of characters after the non-first character in the text to be predicted.

Figure 4:
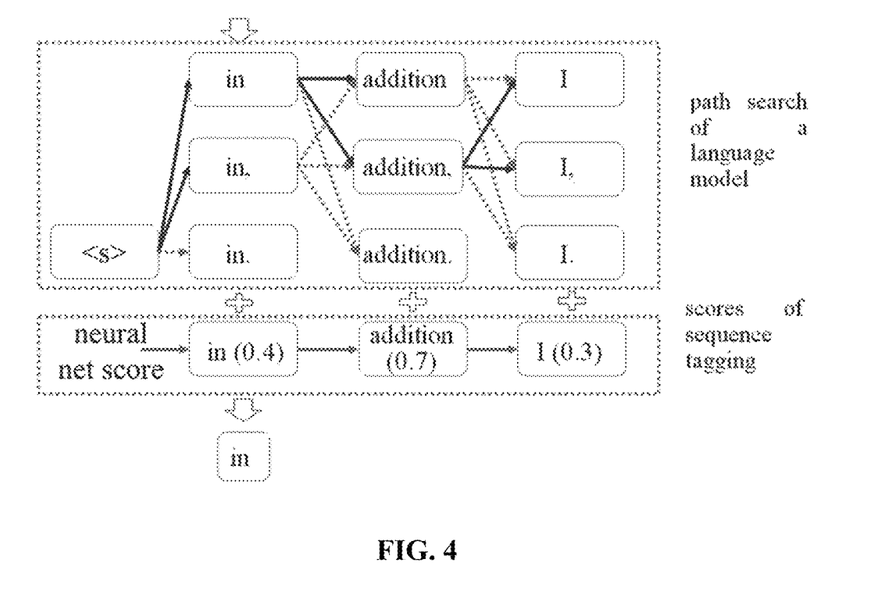
FIG. 4 is a schematic diagram of determining a punctuation existence situation of a character.

In the present disclosure, FIG. 4 is a schematic diagram of determining a punctuation existence situation of a character. In FIG. 4, for a character "addition", it is determined that the punctuation existence situation of the character "addition" is that a comma follows the character "addition". In the subsequent processing of the character "I", scores of prediction results of the character "I" are determined based on the character "addition" and the comma following the character "addition", and then a choice is made accordingly.

With the method for predicting the punctuation, the text to be predicted is obtained. The text to be predicted is inputted into the preset sequence tagging model to obtain the first punctuation prediction result of each character in the text to be predicted. Regarding each character in the text to be predicted, in response to the corresponding character being the first character in the text to be predicted, for each of the at least one prediction result of the corresponding first character, the text to be inputted corresponding to each of the at least one prediction result is generated based on the text to be predicted and the corresponding prediction result. In response to the corresponding character being the non-first character in the text to be predicted, for each of the at least one prediction result of the corresponding non-first character, the text to be inputted corresponding to each of the at least one prediction result is generated based on the punctuation existence situation of each of the at least one character before the non-first character in the text to be predicted, the text to be predicted and the corresponding prediction result. Consequently, whether the punctuation follows each character in the text and the type of the punctuation are determined based on the sequence tagging model and the language model. In this manner, advantages of the sequence tagging model and the language model are combined, such that the efficiency of predicting the punctuation is improved.

To implement the above embodiments, embodiments of the present disclosure also provide an apparatus for predicting a punctuation.

Figure 5:
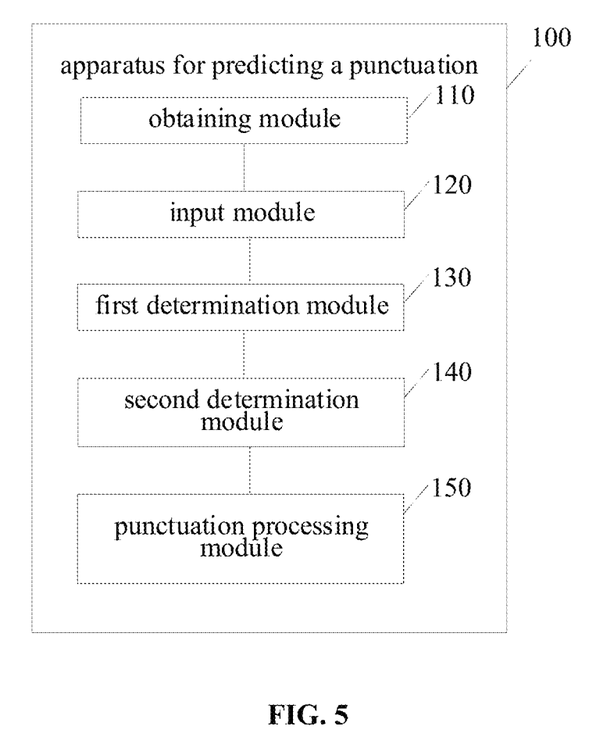
FIG. 5 is a schematic diagram according to Embodiment 3 of the present disclosure.

FIG. 5 is a schematic diagram according to Embodiment 3 of the present disclosure. As illustrated in FIG. 3, an apparatus for predicting a punctuation 100 includes an obtaining module 110, an input module 120, a first determination module 130, a second determination module 140, and a punctuation processing module 150.

The obtaining module 110 is configured to obtain a text to be predicted.

The input module 120 is configured to input the text to be predicted into a preset sequence tagging model to obtain a first punctuation prediction result of each character in the text to be predicted. The first punctuation prediction result includes at least one prediction result and a first score corresponding to each of the at least one prediction result. Each of the at least one prediction result represents whether the punctuation follows the corresponding character and a type of the punctuation.

The first determination module 130 is configured to, for each character in the text to be predicted and each of the at least one prediction result of the corresponding character, generate a text to be inputted corresponding to each of the at least one prediction result based on the text to be predicted and the corresponding prediction result, and input the text to be inputted into a preset language model to obtain a second score corresponding to each of the at least one prediction result.

The second determination module 140 is configured to determine a punctuation existence situation of the corresponding character based on the first score and the second score corresponding to each of the at least one prediction result.

The punctuation processing module 150 is configured to perform punctuation processing on the text to be predicted based on the punctuation existence situation of each character in the text to be predicted to obtain a punctuated text corresponding to the text to be predicted.

In some embodiments of the present disclosure, the input module 120 is configured to: input the text to be predicted into the preset sequence tagging model to obtain the at least one prediction result corresponding to each character in the text to be predicted and a prediction probability of each of the at least one prediction result; and for each of the at least one prediction result of each character, perform reciprocal operation and logarithmic operation on the prediction probability of the corresponding prediction result to obtain the first score corresponding to the corresponding prediction result.

In some embodiments of the present disclosure, the first determination module 130 is configured to: for each character in the text to be predicted, determine whether the corresponding character is a first character in the text to be predicted; in response to the corresponding character being the first character in the text to be predicted, for each of the at least one prediction result of the corresponding first character, generate a text to be inputted corresponding to each of the at least one prediction result based on the text to be predicted and the corresponding prediction result; and in response to the corresponding character being a non-first character in the text to be predicted, for each of the at least one prediction result of the corresponding non-first character, generate a text to be inputted corresponding to each of the at least one prediction result based on a punctuation existence situation of each of at least one character before the non-first character in the text to be predicted, the text to be predicted and the corresponding prediction result.

In some embodiments of the present disclosure, the text to be inputted corresponding to each of the at least one prediction result of the non-first character includes the at least one character before the non-first character, content represented by the punctuation existence situation of each of the at least one character before the non-first character, the non-first character, and content represented by the corresponding prediction result. In response to that the corresponding prediction result represents that no punctuation follows the character, the content is empty; and in response to that the corresponding prediction result represents that a punctuation follows the character, the content is a type of the punctuation.

In some embodiments of the present disclosure, the text to be inputted corresponding to each of the at least one prediction result of the non-first character includes the at least one character before the non-first character, content represented by the punctuation existence situation of each of the at least one character before the non-first character, the non-first character, content represented by the corresponding prediction result, and a preset number of characters after the non-first character in the text to be predicted.

In some embodiments of the present disclosure, the second determination module 140 is configured to: for each of the at least one prediction result of the character, obtain the first score and the second score corresponding to the corresponding prediction result; perform a weighted sum calculation on the first score and the second score to obtain a total score corresponding to the corresponding prediction result; and determine the punctuation existence situation of the character based on a prediction result with a smallest total score.

In some embodiments of the present disclosure, the punctuation processing module 150 is configured to: for each character in the text to be predicted, determine whether the punctuation follows the corresponding character based on the punctuation existence situation of the corresponding character; in response to that the punctuation follows the corresponding character, add the punctuation to follow the character in the text to be predicted based on a type of the punctuation; and obtain the punctuated text corresponding to the text to be predicted after all characters in the text to be predicted are processed.

It should be noted that the foregoing explanation of the method for predicting the punctuation is also applicable to the apparatus for predicting the punctuation according to embodiments of the present disclosure, and will not be repeated here.

With the method for predicting the punctuation, the text to be predicted is obtained. The text to be predicted is inputted into the preset sequence tagging model to obtain the first punctuation prediction result of each character in the text to be predicted. The first punctuation prediction result includes at least one prediction result and the first score corresponding to each of the at least one prediction result. Each of the at least one prediction result represents whether the punctuation follows the corresponding character and the type of the punctuation. For each character in the text to be predicted and each of the at least one prediction result of the corresponding character, the text to be inputted corresponding to each of the at least one prediction result is generated based on the text to be predicted and the corresponding prediction result. The text to be inputted is inputted into the preset language model to obtain the second score corresponding to each of the at least one prediction result. The punctuation existence situation of the corresponding character is determined based on the first score and the second score corresponding to each of the at least one prediction result. The punctuation processing is performed on the text to be predicted based on the punctuation existence situation of each character in the text to be predicted to obtain the punctuated text corresponding to the text to be predicted. Consequently, whether the punctuation follows each character in the text and the type of the punctuation are determined based on the sequence tagging model and the language model. In this manner, advantages of the sequence tagging model and the language model are combined, such that the efficiency of predicting the punctuation is improved.

According to embodiments of the present disclosure, an electronic device and a readable storage medium are provided.

Figure 6:
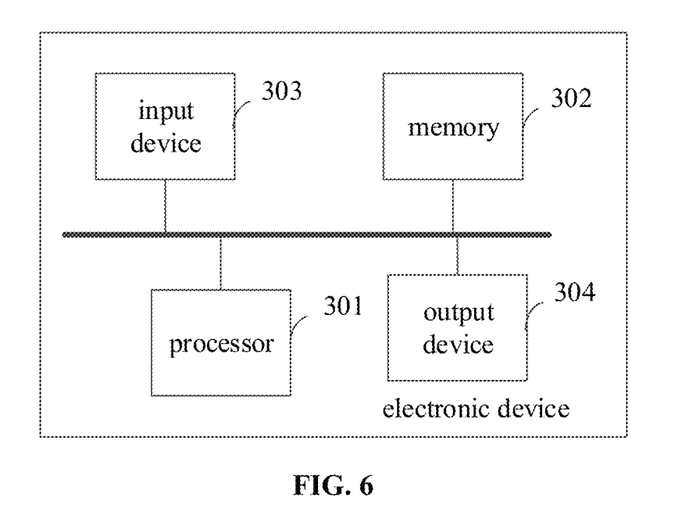
FIG. 6 is a block diagram of an electronic device for implementing a method for predicting a punctuation according to embodiments of the present disclosure.

FIG. 6 is a block diagram of an electronic device for implementing a method for predicting a punctuation according to embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As shown in FIG. 6, the electronic device includes: one or more processors 301, a memory 302, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 301 is taken as an example in FIG. 6.

The memory 302 is a non-transitory computer-readable storage medium according to the embodiments of the present disclosure. The memory stores instructions executable by at least one processor, so that the at least one processor executes the method for predicting the punctuation provided by the present disclosure. The non-transitory computer-readable storage medium according to the present disclosure stores computer instructions, which are configured to make the computer execute the method for predicting the punctuation provided by the present disclosure.

As a non-transitory computer-readable storage medium, the memory 302 may be configured to store non-transitory software programs, non-transitory computer executable programs and modules, such as program instructions/modules (for example, the obtaining module 110, the input module 120, the first determination module 130, the second determination module 140, and the punctuation processing module 150 illustrated in FIG. 5) corresponding to the method for predicting the punctuation according to embodiments of the present disclosure. The processor 301 executes various functional applications and performs data processing of the server by running non-transitory software programs, instructions and modules stored in the memory 302, that is, the method for predicting the punctuation according to the foregoing method embodiments is implemented.

The memory 302 may include a storage program area and a storage data area, where the storage program area may store an operating system and applications required for at least one function; and the storage data area may store data created according to the use of the electronic device, and the like. In addition, the memory 302 may include a high-speed random-access memory, and may further include a non-transitory memory, such as at least one magnetic disk memory, a flash memory device, or other non-transitory solid-state memories. In some embodiments, the memory 302 may optionally include memories remotely disposed with respect to the processor 301, and these remote memories may be connected to the electronic device, which is configured to implement the method for predicting the punctuation, through a network. Examples of the network include, but are not limited to, the Internet, an intranet, a local area network, a mobile communication network, and combinations thereof.

The electronic device configured to implement the method for predicting the punctuation may further include an input device 303 and an output device 304. The processor 301, the memory 302, the input device 303 and the output device 304 may be connected through a bus or in other manners. FIG. 6 is illustrated by establishing the connection through a bus.

The input device 303 may receive input numeric or character information, and generate key signal inputs related to user settings and function control of the electronic device configured to implement the method for predicting the punctuation, such as a touch screen, a keypad, a mouse, a trackpad, a touchpad, a pointing stick, one or more mouse buttons, trackballs, joysticks and other input devices. The output device 304 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for predicting a punctuation in a text, comprising:

inputting a text to be predicted into a preset sequence tagging model to obtain at least one prediction result and a first score corresponding to each of the at least one prediction result of each character in the text to be predicted, each of the at least one prediction result representing whether a punctuation follows the corresponding character and a type of the punctuation;

generating a text to be inputted corresponding to each of the at least one prediction result based on the text to be predicted and the corresponding prediction result;

inputting the text to be inputted into a preset language model to obtain a second score corresponding to each of the at least one prediction result;

determining a punctuation existence situation of the corresponding character based on the first score and the second score corresponding to each of the at least one prediction result; and performing punctuation processing on the text to be predicted based on the punctuation existence situation of each character in the text to be predicted to obtain a punctuated text corresponding to the text to be predicted.

2. The method of claim 1, wherein inputting the text to be predicted into the preset sequence tagging model to obtain the at least one prediction result and the first score corresponding to each of the at least one prediction result of each character in the text to be predicted, comprises:

inputting the text to be predicted into the preset sequence tagging model to obtain the at least one prediction result corresponding to each character in the text to be predicted and a prediction probability of each of the at least one prediction result; and performing reciprocal operation and logarithmic operation on the prediction probability of the corresponding prediction result to obtain the first score corresponding to the corresponding prediction result.

3. The method of claim 1, wherein generating the text to be inputted corresponding to each of the at least one prediction result based on the text to be predicted and the corresponding prediction result comprises:

for each character in the text to be predicted, determining whether the corresponding character is a first character in the text to be predicted;

in response to the corresponding character being the first character in the text to be predicted, for each of the at least one prediction result of the corresponding first character, generating a text to be inputted corresponding to each of the at least one prediction result based on the text to be predicted and the corresponding prediction result; and in response to the corresponding character being a non-first character in the text to be predicted, for each of the at least one prediction result of the corresponding non-first character, generating a text to be inputted corresponding to each of the at least one prediction result based on a punctuation existence situation of each of at least one character before the non-first character in the text to be predicted, the text to be predicted and the corresponding prediction result.

4. The method of claim 3, wherein the text to be inputted corresponding to each of the at least one prediction result of the non-first character comprises: the at least one character before the non-first character, content represented by the punctuation existence situation of each of the at least one character before the non-first character, the non-first character, and content represented by the corresponding prediction result;

wherein in response to that the corresponding prediction result represents that no punctuation follows the character, the content is empty; and in response to that the corresponding prediction result represents that a punctuation follows the character, the content is a type of the punctuation;

wherein in response to that the punctuation existence situation represents that no punctuation follows the character, the content is empty; and in response to that the punctuation existence situation represents that a punctuation follows the character, the content is a type of the punctuation.

5. The method of claim 3, wherein the text to be inputted corresponding to each of the at least one prediction result of the non-first character comprises: the at least one character before the non-first character, content represented by the punctuation existence situation of each of the at least one character before the non-first character, the non-first character, content represented by the corresponding prediction result, and a preset number of characters after the non-first character in the text to be predicted;

wherein in response to that the corresponding prediction result represents that no punctuation follows the character, the content is empty; and in response to that the corresponding prediction result represents that a punctuation follows the character, the content is a type of the punctuation;

wherein in response to that the punctuation existence situation represents that no punctuation follows the character, the content is empty; and in response to that the punctuation existence situation represents that a punctuation follows the character, the content is a type of the punctuation.

6. The method of claim 1, wherein determining the punctuation existence situation of the corresponding character based on the first score and the second score corresponding to each of the at least one prediction result comprises:

for each of the at least one prediction result of the character, obtaining the first score and the second score corresponding to the corresponding prediction result;

performing a weighted sum calculation on the first score and the second score to obtain a total score corresponding to the corresponding prediction result; and determining the punctuation existence situation of the character based on a prediction result with a smallest total score.

7. The method of claim 1, wherein performing the punctuation processing on the text to be predicted based on the punctuation existence situation of each character in the text to be predicted to obtain the punctuated text corresponding to the text to be predicted comprises:

for each character in the text to be predicted, determining whether the punctuation follows the corresponding character based on the punctuation existence situation of the corresponding character;

in response to that the punctuation follows the corresponding character, adding the punctuation to follow the character in the text to be predicted based on a type of the punctuation; and obtaining the punctuated text corresponding to the text to be predicted after all characters in the text to be predicted are processed.

8. An electronic device, comprising:

at least one processor; and a storage device coupled to the at least one processor; wherein, the storage device stores an instruction executable by the at least one processor, and when the instruction is executed by the at least one processor, the at least one processor implements a method for predicting a punctuation in a text, the method comprising:

inputting a text to be predicted into a preset sequence tagging model to obtain at least one prediction result and a first score corresponding to each of the at least one prediction result of each character in the text to be predicted, each of the at least one prediction result representing whether a punctuation follows the corresponding character and a type of the punctuation;

generating a text to be inputted corresponding to each of the at least one prediction result based on the text to be predicted and the corresponding prediction result;

inputting the text to be inputted into a preset language model to obtain a second score corresponding to each of the at least one prediction result;

determining a punctuation existence situation of the corresponding character based on the first score and the second score corresponding to each of the at least one prediction result; and performing punctuation processing on the text to be predicted based on the punctuation existence situation of each character in the text to be predicted to obtain a punctuated text corresponding to the text to be predicted.

9. The electronic device of claim 8, wherein inputting the text to be predicted into the preset sequence tagging model to obtain the at least one prediction result and the first score corresponding to each of the at least one prediction result of each character in the text to be predicted, comprises:
  inputting the text to be predicted into the preset sequence tagging model to obtain the at least one prediction result corresponding to each character in the text to be predicted and a prediction probability of each of the at least one prediction result; and
  performing reciprocal operation and logarithmic operation on the prediction probability of the corresponding prediction result to obtain the first score corresponding to the corresponding prediction result.

10. The electronic device of claim 8, wherein generating the text to be inputted corresponding to each of the at least one prediction result based on the text to be predicted and the corresponding prediction result comprises:
  for each character in the text to be predicted, determining whether the corresponding character is a first character in the text to be predicted;
  in response to the corresponding character being the first character in the text to be predicted, for each of the at least one prediction result of the corresponding first character, generating a text to be inputted corresponding to each of the at least one prediction result based on the text to be predicted and the corresponding prediction result; and
  in response to the corresponding character being a non-first character in the text to be predicted, for each of the at least one prediction result of the corresponding non-first character, generating a text to be inputted corresponding to each of the at least one prediction result based on a punctuation existence situation of each of at least one character before the non-first character in the text to be predicted, the text to be predicted and the corresponding prediction result.

11. The electronic device of claim 10, wherein the text to be inputted corresponding to each of the at least one prediction result of the non-first character comprises: the at least one character before the non-first character, content represented by the punctuation existence situation of each of the at least one character before the non-first character, the non-first character, and content represented by the corresponding prediction result;
  wherein in response to that the corresponding prediction result represents that no punctuation follows the character, the content is empty; and in response to that the corresponding prediction result represents that a punctuation follows the character, the content is a type of the punctuation;
  wherein in response to that the punctuation existence situation represents that no punctuation follows the character, the content is empty; and in response to that the punctuation existence situation represents that a punctuation follows the character, the content is a type of the punctuation.

12. The electronic device of claim 10, wherein the text to be inputted corresponding to each of the at least one prediction result of the non-first character comprises: the at least one character before the non-first character, content represented by the punctuation existence situation of each of the at least one character before the non-first character, the non-first character, content represented by the corresponding prediction result, and a preset number of characters after the non-first character in the text to be predicted;
  wherein in response to that the corresponding prediction result represents that no punctuation follows the character, the content is empty; and in response to that the corresponding prediction result represents that a punctuation follows the character, the content is a type of the punctuation;
  wherein in response to that the punctuation existence situation represents that no punctuation follows the character, the content is empty; and in response to that the punctuation existence situation represents that a punctuation follows the character, the content is a type of the punctuation.

13. The electronic device of claim 8, wherein determining the punctuation existence situation of the corresponding character based on the first score and the second score corresponding to each of the at least one prediction result comprises:
  for each of the at least one prediction result of the character, obtaining the first score and the second score corresponding to the corresponding prediction result;
  performing a weighted sum calculation on the first score and the second score to obtain a total score corresponding to the corresponding prediction result; and
  determining the punctuation existence situation of the character based on a prediction result with a smallest total score.

14. The electronic device of claim 8, wherein performing the punctuation processing on the text to be predicted based on the punctuation existence situation of each character in the text to be predicted to obtain the punctuated text corresponding to the text to be predicted comprises:
  for each character in the text to be predicted, determining whether the punctuation follows the corresponding character based on the punctuation existence situation of the corresponding character;
  in response to that the punctuation follows the corresponding character, adding the punctuation to follow the character in the text to be predicted based on a type of the punctuation; and
  obtaining the punctuated text corresponding to the text to be predicted after all characters in the text to be predicted are processed.

15. A non-transitory computer-readable storage medium having a computer instruction stored thereon, wherein the computer instruction is configured to make a computer implement a method for predicting a punctuation in a text, the method comprising:
  inputting a text to be predicted into a preset sequence tagging model to obtain at least one prediction result and a first score corresponding to each of the at least one prediction result of each character in the text to be predicted, each of the at least one prediction result representing whether a punctuation follows the corresponding character and a type of the punctuation;
  generating a text to be inputted corresponding to each of the at least one prediction result based on the text to be predicted and the corresponding prediction result;
  inputting the text to be inputted into a preset language model to obtain a second score corresponding to each of the at least one prediction result;
  determining a punctuation existence situation of the corresponding character based on the first score and the second score corresponding to each of the at least one prediction result; and
  performing punctuation processing on the text to be predicted based on the punctuation existence situation of each character in the text to be predicted to obtain a punctuated text corresponding to the text to be predicted.

16. The non-transitory computer-readable storage medium of claim 15, wherein inputting the text to be predicted into the preset sequence tagging model to obtain the at least one prediction result and the first score corresponding to each of the at least one prediction result of each character in the text to be predicted, comprises:
   inputting the text to be predicted into the preset sequence tagging model to obtain the at least one prediction result corresponding to each character in the text to be predicted and a prediction probability of each of the at least one prediction result; and
   performing reciprocal operation and logarithmic operation on the prediction probability of the corresponding prediction result to obtain the first score corresponding to the corresponding prediction result.

17. The non-transitory computer-readable storage medium of claim 15, wherein generating the text to be inputted corresponding to each of the at least one prediction result based on the text to be predicted and the corresponding prediction result comprises:
   for each character in the text to be predicted, determining whether the corresponding character is a first character in the text to be predicted;
   in response to the corresponding character being the first character in the text to be predicted, for each of the at least one prediction result of the corresponding first character, generating a text to be inputted corresponding to each of the at least one prediction result based on the text to be predicted and the corresponding prediction result; and
   in response to the corresponding character being a non-first character in the text to be predicted, for each of the at least one prediction result of the corresponding non-first character, generating a text to be inputted corresponding to each of the at least one prediction result based on a punctuation existence situation of each of at least one character before the non-first character in the text to be predicted, the text to be predicted and the corresponding prediction result.

18. The non-transitory computer-readable storage medium of claim 17, wherein the text to be inputted corresponding to each of the at least one prediction result of the non-first character comprises: the at least one character before the non-first character, content represented by the punctuation existence situation of each of the at least one character before the non-first character, the non-first character, and content represented by the corresponding prediction result;
   wherein in response to that the corresponding prediction result represents that no punctuation follows the character, the content is empty; and in response to that the corresponding prediction result represents that a punctuation follows the character, the content is a type of the punctuation;
   wherein in response to that the punctuation existence situation represents that no punctuation follows the character, the content is empty; and in response to that the punctuation existence situation represents that a punctuation follows the character, the content is a type of the punctuation.

19. The non-transitory computer-readable storage medium of claim 17, wherein the text to be inputted corresponding to each of the at least one prediction result of the non-first character comprises: the at least one character before the non-first character, content represented by the punctuation existence situation of each of the at least one character before the non-first character, the non-first character, content represented by the corresponding prediction result, and a preset number of characters after the non-first character in the text to be predicted;
   wherein in response to that the corresponding prediction result represents that no punctuation follows the character, the content is empty; and in response to that the corresponding prediction result represents that a punctuation follows the character, the content is a type of the punctuation;
   wherein in response to that the punctuation existence situation represents that no punctuation follows the character, the content is empty; and in response to that the punctuation existence situation represents that a punctuation follows the character, the content is a type of the punctuation.

20. The non-transitory computer-readable storage medium of claim 15, wherein determining the punctuation existence situation of the corresponding character based on the first score and the second score corresponding to each of the at least one prediction result comprises:
   for each of the at least one prediction result of the character, obtaining the first score and the second score corresponding to the corresponding prediction result;
   performing a weighted sum calculation on the first score and the second score to obtain a total score corresponding to the corresponding prediction result; and
   determining the punctuation existence situation of the character based on a prediction result with a smallest total score.

* * * * *